US006634023B1

(12) United States Patent
Komatsu et al.

(10) Patent No.: US 6,634,023 B1
(45) Date of Patent: *Oct. 14, 2003

(54) COMPILE METHOD, EXCEPTION HANDLING METHOD AND COMPUTER

(75) Inventors: Hideaki Komatsu, Kanagawa-ken (JP); Takeshi Oqasawara, Tokyo-to (JP)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/334,789

(22) Filed: Jun. 16, 1999

(30) Foreign Application Priority Data

Jun. 18, 1998 (JP) .......................................... 10-170945

(51) Int. Cl.[7] ................................................ G06F 9/45

(52) U.S. Cl. ........................ 717/159; 717/124; 717/131; 717/132; 717/133; 717/151; 717/152; 717/154; 717/155; 717/156; 717/157; 717/161

(58) Field of Search ................................. 717/129, 130, 717/148, 124, 127, 131–133, 151–152, 154–161

(56) References Cited

U.S. PATENT DOCUMENTS

| | | | | |
|---|---|---|---|---|
| 5,596,733 A | * | 1/1997 | Worley, Jr. et al. | ......... 712/244 |
| 5,926,832 A | * | 7/1999 | Wing et al. | .................. 711/141 |
| 5,966,537 A | * | 10/1999 | Ravichandran | ................ 717/9 |
| 6,128,722 A | * | 10/2000 | Fry et al. | ....................... 712/23 |

OTHER PUBLICATIONS

Le, "Out–of–Order Execution Technique for Runtime Binary Translators", ACM, pp. 151–158, Oct., 1998.*
Sinha et al., "Analysis of Programs With Exception–Handling Constructs", IEEE, pp. 1–10, Nov. 1998.*
Steven et al., "Using a Resource–Limited Instruction Scheduler to Evaluate The iHARP Processor", IEEE, pp. 23–31, Jan. 1995.*

(List continued on next page.)

Primary Examiner—Gregory Morse
Assistant Examiner—Ted T. Vo
(74) Attorney, Agent, or Firm—Scully, Scott, Murphy & Presser; Manny W. Schecter (57) ABSTRACT

The present invention enables re-ordering of instructions to be executed while assuring a precise exception. In Java language, an optimization process of re-ordering instructions to be executed is performed by Just-In-Time compiler. For instance, the instructions lining in order from instruction E1 which was moved forward to instruction S2 which had been located before E1 is registered as interrupt inhibited section R1, and from instruction S4 which was moved forward to instruction S3 which had been located before S4 is registered as interrupt inhibited section R2 (S is an instruction which has an affect observable from the outside at the execution, and E is an instruction which may cause an exception). Also, in FIG. 7, S4 which was an instruction behind E1 in the original order is registered as R1's instruction invalid at an exception. If E1 causes an exception, an interrupt handler is activated and the instructions of interrupt inhibited section R1 are copied to another area. S4 is not copied in that case. In addition, a branch code to an exception handling routine is attached to the end of the copy. If execution is restarted from S1, the instructions required to be executed for assuring the precise exception are executed, and it may move on to an exception handling routine thereafter.

23 Claims, 7 Drawing Sheets

OTHER PUBLICATIONS

Choi et al., "Efficient and Precise Modeling of Exceptions for The Analysis of Java Programs", ACM, pp. 21–31, Sep. 1999.*

Goodenough, "Exception Handling: Issues and a Proposed Notation", pp. 683–696, Dec. 1975.*

IBM Technical Disclosure Bulletin, "Time Atributed Dependence Graph Scheme for Prediction of Execution Time for a Block of Assignment Statements with Looping", vol. 36, No. 9A, pp. 621–622, Sep. 1993.*

Thekkath et al., "Hardware and Software Support for Efficient Exception Handling", ACM, pp. 110–119, 1994.*

Bringmann et al., "Speculative Execution Exception recovery using Write–back Suppression", IEEE, pp. 214–223, 1993.*

Lawden et al., "ADAM The Starlink Software Environment", http://www.starlink.rl.ac.uk/star/docs/sg4.htx/sg4.html, Starlink Guide 4.2, section: Exception handler p. 1–3, 1992.*

"Handling of an Exception", by James Goslimg, et al., The Java Language Specification 11.3.1, Addison–Wesley ISBN 0–201–63451–1, 1996, Sections 11.3–11.4, pp. 204–206.

"Object and Native Code Thread Mobility Among Heterogeneous Computers", by Bjarne Steensgaard, et at. Proceedings of the Fifteenth ACM Symposium on Operating System Principles, 1995, pp. 68–77.

* cited by examiner

COMPILE METHOD, EXCEPTION HANDLING METHOD AND COMPUTER

BACKGROUND OF THE INVENTION

1. Technical Field

The present invention relates to a compiler, particularly to the Just In Time Compiler of Java (a trademark of Sun Microsystems).

2. Prior Art

Currently, Java is considered not merely as a common language for network computing but also as a standard object-oriented language independent of platforms. While Java is more descriptive than other languages, there is still a problem in execution speed.

In a Java program, execution of a thread, which is a unit for executing a program, has a characteristic that it may be synchronously or asynchronously interrupted by an exception. Any execution interrupted by an exception must generally re-start from a code in Java's catch or finally block which can handle the exception. A synchronous exception in this case is one which is issued as a result of object handling or by means of explicit description. On the other hand, an asynchronous exception is one which is issued from one thread to another thread, asynchronously.

The timing of occurrence of such exceptions is defined in "The Java Language Specification 11.3.1" (James Goslimg, Bill Joy, Guy Steele, ADDISON-WESLEY ISBN 0-201-63451-1, 1996). That is, in a program, any execution statement before an exception occurred must be executed and any execution statement after the exception occurred must not be executed. These are called precise exceptions. Because of this language specification, and because almost all instructions which refer to an object (memory) may cause an exception, any change of an order of executing instructions or referring to memory and any reduction of referring to memory by using a register were significantly restricted when compiling a Java program.

On the other hand, in the languages which do not have precise exceptions defined such as FORTRAN and C, there is no restriction as to an order of executing instructions, an order of referring to memory, and reduction of memory reference, as far as maintaining a data dependance relationship. These allow utilization of data in a register or data cache or utilization of CPU resources to be improved to acquire maximum system performance. Thus, optimization technique for acquiring maximum hardware performance has a narrower scope for Java or cannot be applied to Java, so an application written in Java often has lower execution speed than ones written in FORTRAN or C.

As regards an asynchronous exception, a technique proposed for optimizing to a degree while assuring a precise exception is polling (The Java Language Specification 11.3.2). Generally, even if an order of executing instructions is changed in a section of a program, it looks externally as if a precise exception is assured when an exception is handled after executing all the instructions to be executed originally before the instruction to which the exception has occurred (The Java Language Specification 11.3.1). In this technique of polling, a thread itself examines whether an exception has occurred and handles the exception if there is one.

As regards polling, however, overhead becomes a big problem since it is checked whether or not there is an exception even when no exception has occurred. As re-ordering of instructions for optimization is frequently performed, the overhead trades off with optimization. Consequently, since exception handling is relatively costly, it cannot be optimized and performance of a CPU with high throughput cannot be well used.

As another method of exception handling without overhead of exception check such as polling, there is interrupt processing. In interrupt processing, an exception related to a thread is handled by an interrupt handler of the thread. For instance, if thread T has an exception synchronously or asynchronously, the interrupt handler is activated in a context of thread T to handle the exception. A context of a thread is the entire contents of registers essential for executing the thread, including a program counter and a stack pointer. If execution of a thread is suspended, the context is retained for next restart of the execution.

Here is a point to pay attention to. A Java program must be continuously executed for the following two reasons, even after an exception has occurred. Even when a thread has an exception, it cannot immediately stop execution. The first reason is that if a program is in the scope of exception handling described in Java's try at the occurrence of the exception, the program must restart the execution from a program clause described with catch or finally which is usually able to handle the exception. The second reason is that, as aforementioned, if an order of executing instructions is changed in section A-B and an exception has occurred in the section, exception handling must be started after having executed the entire section A-B in order to assure the precise exception.

As regards the interrupt processing considered so far, an instruction to be executed in a case indicated in the above second reason is not executed since exception handling is started immediately after an exception has occurred. Thus, there is a problem to which the precise exception cannot be assured by an optimization code. An object of the present invention is to handle exceptions quickly by means of interrupt processing while assuring the precise exception.

It is also an object to enable instructions to be re-ordered while assuring the precise exception.

It is additional object to provide a compiler which enables high speed execution while assuring the precise exception.

SUMMARY OF THE INVENTION

A compiler in the present invention performs the following process. Namely, it executes the steps of: re-ordering an instruction included in a program; and if a first instruction which has an affect, which is observable from the outside at the execution, or a second instruction which may cause an exception is moved so as to be executed before an instruction to be executed before the first or the second instruction in the original order, registering a section as an interrupt inhibited section, wherein the section is from the first or the second instruction position after the movement to a predetermined instruction position before the former position of the first or the second instruction. This registration is performed to the program, and more specifically, to each routine (method) of the program. Thus, when an exception occurs, information becomes easily obtainable as to whether or not it is a section which requires a process to assure the precise exception.

Moreover, it is also possible, if a part of an interrupt inhibited section A overlaps another interrupt inhibited section B including an instruction to be executed after instructions included in the interrupt inhibited section A, to execute a step of registering an instruction within the interrupt inhibited section A, which is made invalid if an exception occurs within the interrupt inhibited section A. This is a process for "adding a section" in the embodiment. If the instruction to be made invalid is executed, the precise exception cannot be assured.

In addition, if an interrupt inhibited section includes another interrupt inhibited section, a step of integrating another interrupt inhibited section may further be executed. This has an effect of decreasing the sections to be registered.

Also, if two interrupt inhibited sections related to the first instruction partly overlap, a step of registering the section covered by the two interrupt inhibited sections as an interrupt inhibited section may further be executed. When there are too many sections, they are integrated and the number of sections is reduced in this way.

Moreover, the above step of registering may also comprise the steps of: generating an interrupt inhibited sections map by arranging registered interrupt inhibited sections by each routine of the program; and generating a code for registering in the routine the interrupt inhibited sections map and an interrupt handler which uses the interrupt inhibited sections map.

Meanwhile, a rear end of an interrupt inhibited section is decided by the "predetermined instruction", but it may also be an instruction immediately preceding the first or the second instruction position before the movement, which has an affect observable from the outside at the execution. Or, it may also simply be an instruction preceding by one position the first or the second instruction before the movement.

On the other hand, processing in the event that an exception has occurred is as follows. Namely, following steps are executed: issuing an interrupt in response to an occurrence of the exception; determining whether or not, from a state of a processing interrupted by the interrupt, an instruction at the interrupt is an instruction among the interrupt inhibited section associated with the interrupted processing; if the instruction at the interrupt is an instruction among the interrupt inhibited section associated with the interrupted processing, generating a branch instruction to a code for handling the exception after the interrupt inhibited section; and restarting the execution of instructions following the instruction at the interrupt. Thus, it is possible to easily determine whether it is a case where an exception is ordinarily processed or a case where processing of the present invention is required, and to branch into an exception handling code after executing instructions for assuring the precise exception.

It is also possible that the generating step-comprises the steps of copying codes among the interrupt inhibited section to another area; and generating a branch code to the code for handling an exception after the copied codes. As a special process is executed, it may have less effect on other processes to execute codes by copying them among the interrupt inhibited section to another area.

Furthermore, the generating step comprises a step of, if there exists an instruction invalid at an exception among the interrupt inhibited section, setting so as not to execute the instruction invalid at an exception. This is for assuring the precise exception.

It is also possible that the determining step comprises the steps of: if an exception occurs during execution of a second instruction, determining as to an interrupt inhibited section registered in relation to the second instruction; and if an interrupt is issued by any other processing, determining as to an interrupt inhibited section registered in relation to the first instruction. This is intended to have each interrupt inhibited section include information of whether an exception is synchronous or asynchronous, and to change the interrupt inhibited section to be used for the determining step depending on how the exception occurred.

It is also possible to further comprise a step of, if an exception occurs as to the second instruction during execution of the instruction among the interrupt inhibited section, branching into a routine for handling the exception. In addition, the instruction invalid at an exception may be a first instruction which has an affect, which is observable from the outside at the execution, or a second instruction which may cause an exception, which may cause a problem in assuring the precise exception.

As above, the present invention has been explained as a processing flow. However, it is also possible to implement a computer which executes such processing or to implement it as a program for executing such processing.

Moreover, a program for performing such processing may be stored on storage media such as an MO disk, a floppy disk or a CD-ROM.

BRIEF DESCRIPTION OF THE DRAWINGS

Preferred embodiments of the present invention will now be described, by way of example only, with reference to the accompanying drawings in which.

DETAILED DESCRIPTION OF THE PREFERRED EMBODIMENTS OF THE INVENTION

Figure 1:
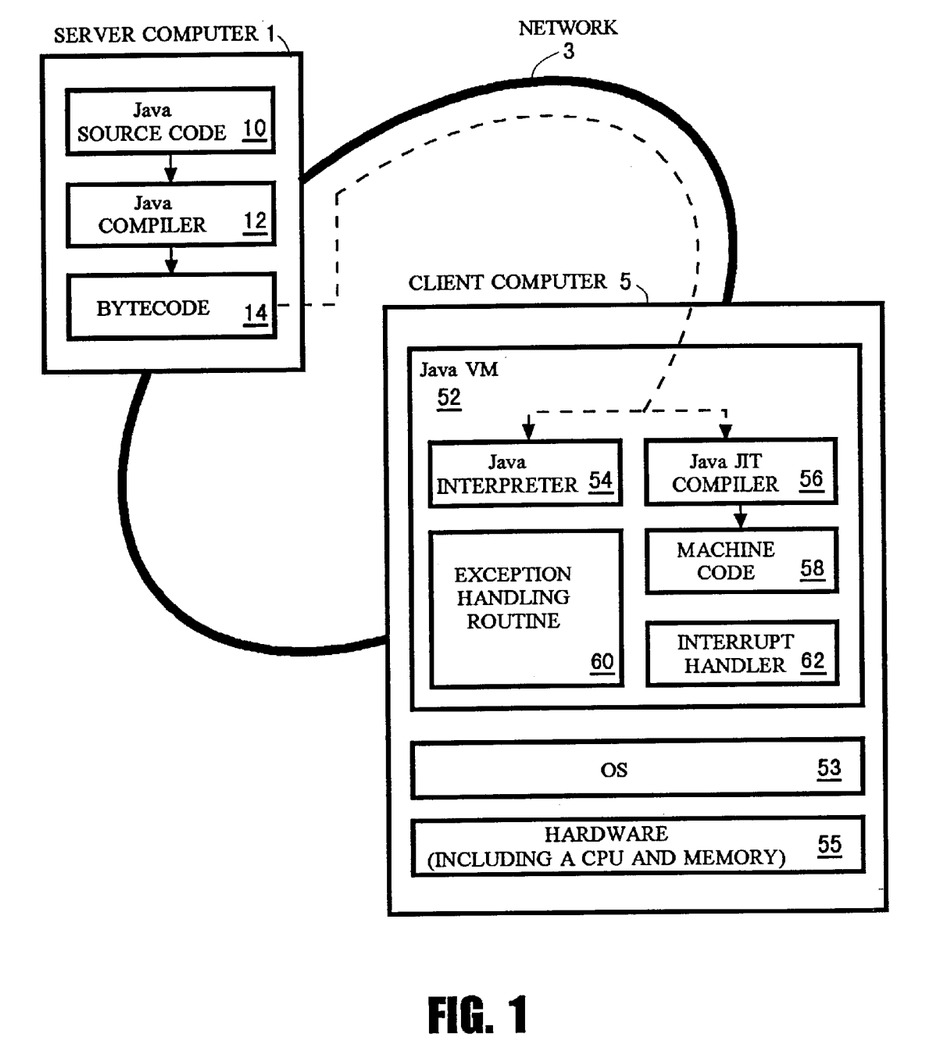
FIG. 1 is a diagram representing device configuration of the present invention.

Device configuration of the present invention is described by using FIG. 1. Server computer 1 and client computer 5 are connected via network 3. Client computer 5 comprises Java VM (Virtual Machine) 52 and OS (Operating System) 53 and hardware (including a CPU and memory) 55. In addition, Java VM 52 comprises Java interpreter 54 or Java JIT compiler 56, exception handling routine 60 and interrupt handler 62. It may also comprise both interpreter 54 and JIT compiler 56. Moreover, client computer 5 may also be, other than an ordinary computer, a so-called network computer or an information household electric appliance which has a small-sized memory or does not have a sub-storage such as a hard disk.

In the server computer 1, Java source code 10 is compiled by Java compiler 12. The result of this compilation is bytecode 14. This bytecode 14 is transferred to client computer 5 via network 3. Bytecode 14 is a native code for a Java virtual machine (Java VM) 52 installed in a WWW browser (World Wide Web Browser), etc. within client computer 5. If it is actually executed by a CPU of hardware 55, Java interpreter 54 or Java JIT compiler 56 is used. Interpreter 54 decodes bytecode 14 at execution and executes instructions by invoking processing routines provided for each of them. On the other hand, JIT compiler 56 converts a bytecode to machine code 58 by using a compiler in advance or immediately before executing it, and executes it by CPU.

Figure 2:
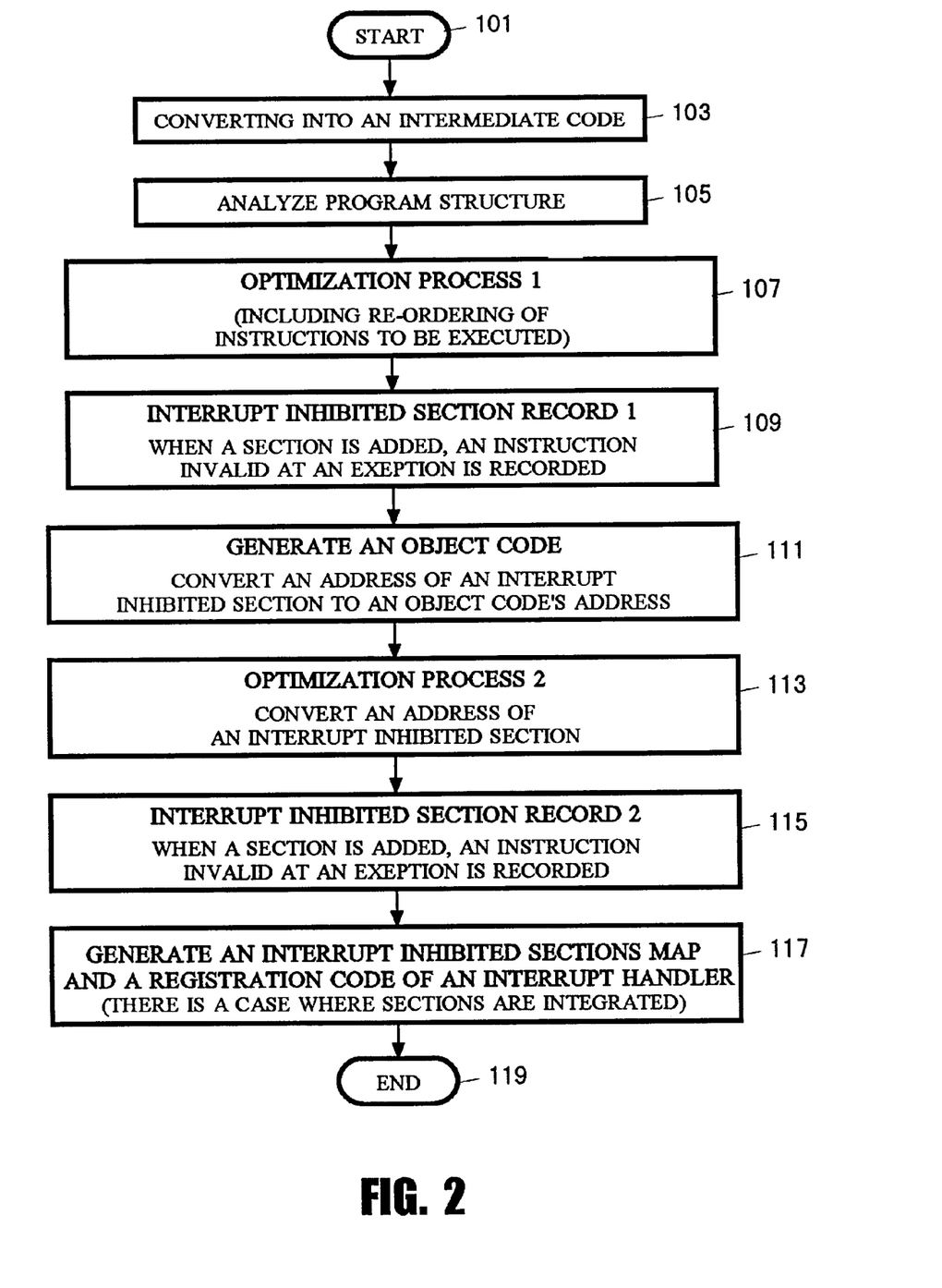
FIG. 2 is a flowchart representing a processing of a JIT compiler.

To begin with, operation of JIT compiler 56 is explained by using FIG. 2. First, bytecode 14 is converted to an intermediate code used by JIT compiler 56 (step 103). The program structure of the intermediate code is analyzed (step 105). For instance, basic blocks, control flows and loops are analyzed. After that, optimization process 1 is performed (step 107). This optimization process 1 is optimization of an intermediate code including re-ordering of executions such as changing an order of memory access. Here, loop transformation, etc. are performed. The processing so far is not different from conventional technology.

Then, recording process 1 of interrupt inhibited sections is executed (step 109). If optimization process 1 performed in step 107 requires a process for assuring the precise exception, the section that requires the process is recorded as an interrupt inhibited section. Here is an explanation of an interrupt inhibited section. Noteworthy instructions are those which may cause an exception and those which have a side effect. Instructions which have a side effect are those which have an affect observable from another thread such as writing into shared memory. In step 107, an order of executing instructions is changed in order to effectively use resources of a computer, but it does not follow that the order of execution may be changed in any manner for effective use. Instruction S which has a side effect must not exceed instruction E which may cause.an exception. This is because, if E causes an exception after the change of the order of executing instructions, the side effect of S which should not be executed can no longer be denied.

Figure 3:
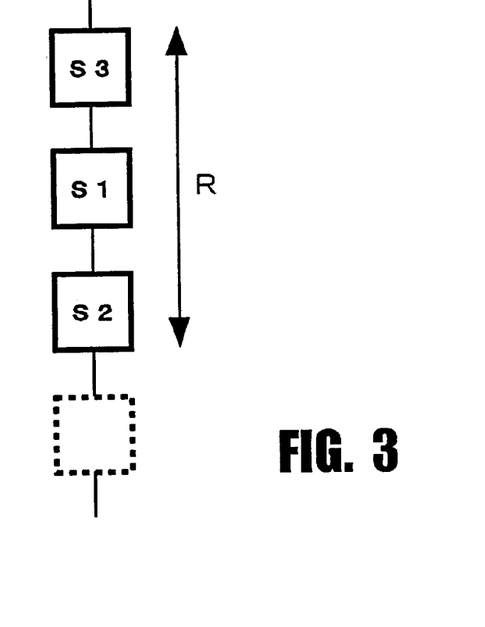
FIG. 3 is a diagram for explaining an asynchronous interrupt inhibited section.

If an instruction to be moved is an instruction Sn which has a side effect and if it overtakes other instructions S1, S2, . . . Sn−1 which have a side effect, a section from Sn after the moving to Sn−1, the last of the overtaken instructions which have a side effect is an interrupt inhibited section R. There may be instructions which have neither a side effect nor an exception respectively among S1, S2, . . . Sn−1 after the moving, and Sn before the moving. FIG. 3 shows a similar example. S3 is an instruction with a side effect which had been located in a box shown in broken lines and moved to a position before S1 through optimization. In this case, an interrupt inhibited section R is from S3 to S2. Meanwhile, there may exist instructions which neither have a side effect nor causes an exception between S2 and the box in broken lines. It is not necessary, however, to include such an instruction in the interrupt inhibited section R, since it does not influence any others. Nevertheless, it is also possible to establish the interrupt inhibited section R as a section from S3 to the instruction preceding the box by one position (or any of the instructions between S2 and the one preceding the box by one position).

A purpose of this interrupt inhibited section is to retain the original side effect of S1 to Sn, when an asynchronous exception has occurred in a section, by having all the instructions in the section executed before the exception is handled. A section generated in this way is an asynchronous interrupt inhibited section.

Figure 4:
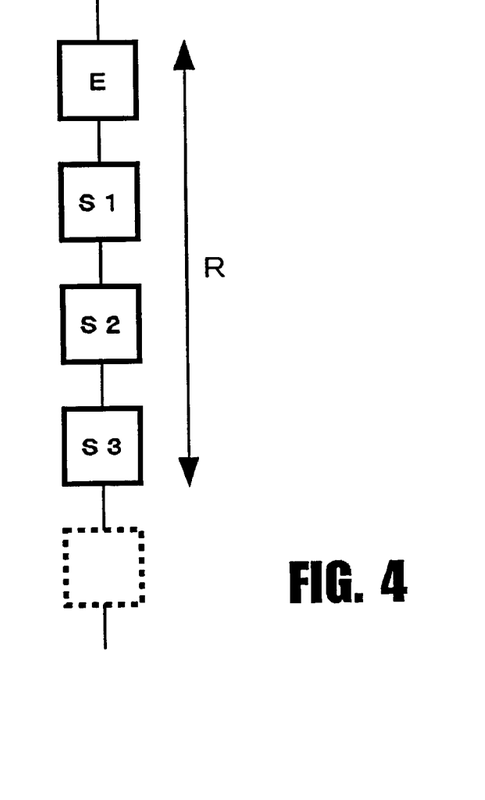
FIG. 4 is a diagram for explaining a synchronous interrupt inhibited section.

Also, if an instruction to be moved is an instruction E which may cause an exception, and if by moving it overtakes other instructions S1 . . . Sn which have a side effect, the section from E after the moving to Sn, the last of the overtaken instructions, is an interrupt inhibited section. There may be instructions which have neither a side effect nor an exception respectively among S1, S2, . . . Sn−1, and Sn. FIG. 4 shows a similar example. Instruction E which may cause an exception has overtaken instructions S1 to S3 which have a side effect. Accordingly, from E to S3 is an interrupt inhibited section R in this case. A purpose of this interrupt inhibited section is to retain the original side effect of S1 to Sn existing before execution of E, when a synchronous exception by E has occurred in a section, by having all the instructions in the section executed before the exception is handled. A section generated in this way is a synchronous interrupt inhibited section. Moreover, the rear end of the section is changeable like an asynchronous interrupt inhibited section.

Whether an interrupt inhibited section is asynchronous or synchronous is distinguished at recording of the section.

In step 107, not only simple re-ordering of instructions as in FIG. 3 and FIG. 4 but also moving of instructions to overlap sections is also performed. There are largely two forms of overlapping of sections. They are addition and integration. In the event of setting a section which entirely includes an existing section, the existing section is no longer necessary. This is integration of sections. When a section which overlaps an existing section is set, there arises addition of a section.

There may be integration and addition of sections with one another among synchronous interrupt inhibited section. Also, there may be integration and addition of sections with one another among asynchronous interrupt inhibited section. There may only be addition of sections between an asynchronous interrupt inhibited section and a synchronous interrupt inhibited section.

In the event of adding sections, any instruction invalid at an exception is recorded (step 109). This instruction invalid at an exception is an instruction which is not executed when an exception has occurred in the section and instructions among the section are executed, in spite of being an instruction among the section. For instance, as in the example of FIG. 5, if instruction S2 which has a side effect is moved to a position preceding S1 and then instruction S4 which has a side effect is moved to a position between S1 and S2, S2 to S1 is asynchronous interrupt inhibited section R1 and S4 to S3 is asynchronous interrupt inhibited section R2. Meanwhile, S1, S2, S3 and S4 were lining before optimization process 1. Under such circumstances, S4 becomes R1's instruction invalid at an exception. This is because, if an asynchronous exception has occurred inside R1 and outside R2, namely between S2 and S4, only S1 and S2 which are instructions having a side effect should be executed but not S4. Generally, when an instruction of an additional section is inserted in an existing section, the instruction which is inserted becomes an instruction invalid at an exception of the existing section.

Figure 6:
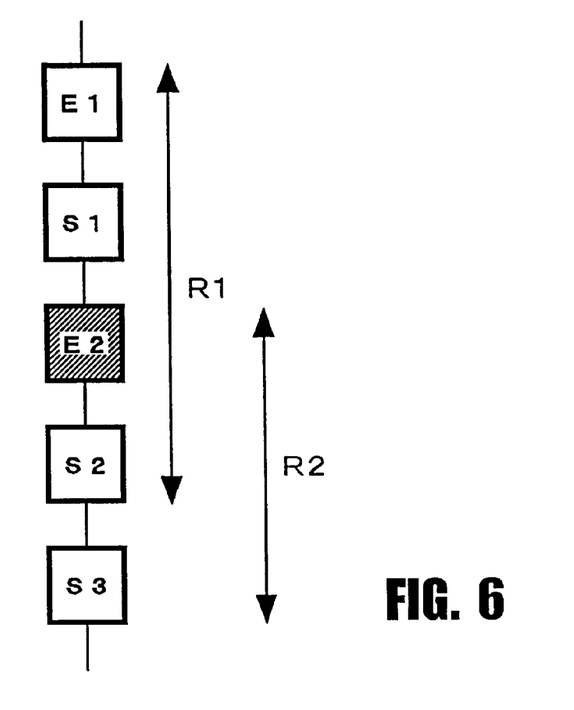
FIG. 6 is a diagram for explaining addition of a synchronous interrupt inhibited section.

While the above is a case of addition of sections with one another among asynchronous interrupt inhibited section, the same is applied to such a case among synchronous interrupt inhibited section. FIG. 6 shows an example. As clearly shown in FIG. 6, they were lining in order of S1, S2, E1, S3 and E2. Under such circumstances, E2 becomes an instruction invalid at an exception. This is because, if an exception has occurred in E1, E2 which should not be executed in the original order is executed. Meanwhile, a policy of not making E2 an instruction invalid at an exception is also possible. This is because E2, as an instruction which may cause an exception, does not have a side effect. In this case, if an exception has occurred in E1, and an exception has occurred in E2 during execution of synchronous interrupt inhibited section R1, it is ignored. However, it may be costly depending on a CPU because of this ignoring and executing following instructions, so it is an instruction invalid at an exception in this embodiment.

Figure 7:
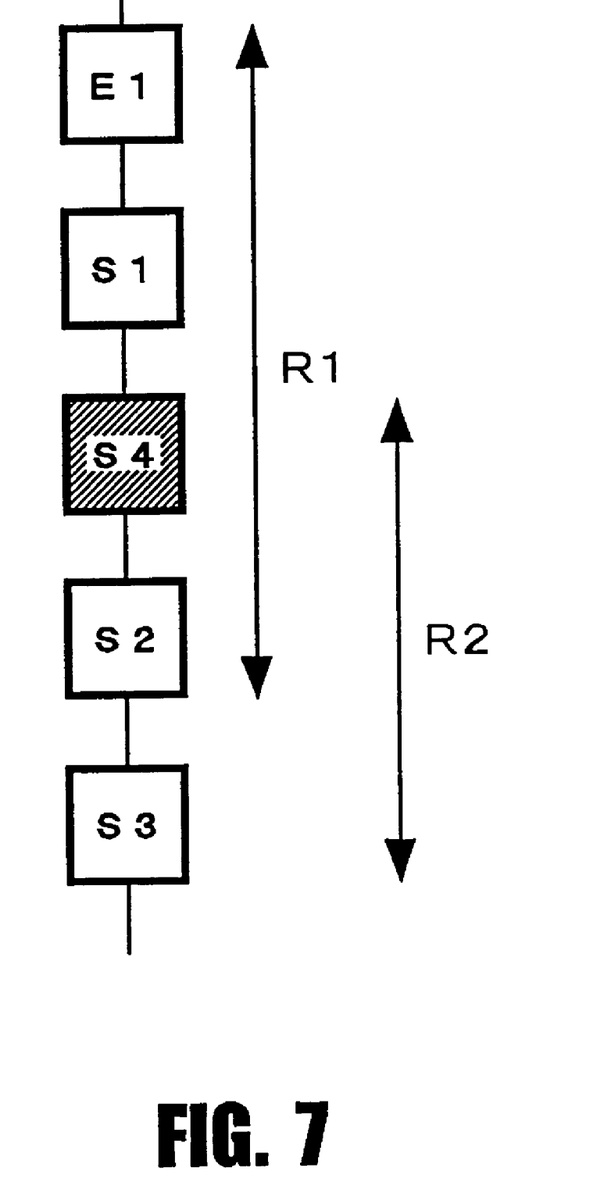
FIG. 7 is a diagram for explaining addition of synchronous and asynchronous interrupt inhibited sections.

The same is applied to a case between an asynchronous interrupt inhibited section and a synchronous interrupt inhibited section. FIG. 7 shows an example. They were lining in order of S1, S2, E1, S3 and S4. Under such circumstances, S4 is an instruction invalid at an exception in a synchronous interrupt inhibited section R1.

Returning to FIG. 2, up to step 109 has been executed. In step 109, addresses of interrupt inhibited sections and an instruction invalid at an exception are those in an intermediate code. Next, an object code is generated (step 111). Namely, an executable code corresponding to the intermediate code is generated. This is not different from conventional processing. Also, a code for registering/deregistering in interrupt handler 62 is generated according to the interrupt processing method of the system. For instance, in OS/2 (a trademark of International Business Machines Corp.) which supports structured exceptions, registering/deregistering in interrupt handler 62 is respectively performed in prologue and epilogue codes of the generated code for the Java method requiring exception handling. In this step 111, addresses in the intermediate code of any interrupt inhibited section and any instruction invalid at an exception recorded together are converted to addresses in the object code.

In addition, optimization process 2 is performed (step 113). Here, optimization of object codes, code scheduling, etc. including a process of changing an order of memory access are performed. This process is not different from a conventional one either. However, as object codes were optimized, the recorded addresses of any interrupt inhibited section and any instruction invalid at an exception are changed to the addresses after the optimization process.

Thereafter, if an interrupt inhibited section is to be established for assuring the precise exception in step 113, an interrupt inhibited section is recorded at an address after step 113 (interrupt inhibited section recording process 2, step 115). Also, if an additional section has arisen, any instruction invalid at an exception is recorded.

Finally, the interrupt inhibited sections recorded up to step 115 (including distinction of asynchronous and synchronous) are arranged for each Java method to make an interrupt inhibited sections map (step 117). An interrupt inhibited sections map also includes any instruction invalid at an exception of the interrupt inhibited sections included in the method. An interrupt inhibited sections map is registered at a location which an interrupt handler can refer to. For instance, in OS/2, interrupt handler 62's registration code is generated for each Java method requiring exception handling, and the registration code includes the address of the interrupt inhibited sections map. By using this, interrupt handler 62 and the interrupt inhibited sections map are registered in the method at execution.

Figure 5:
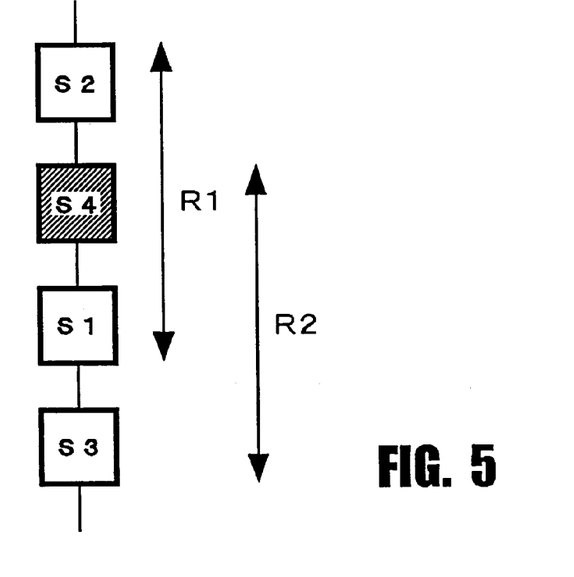
FIG. 5 is a diagram for explaining addition of an asynchronous interrupt inhibited section.

In step 117, when generating an interrupt inhibited sections map, sections are integrated if possible. As explained earlier, integration of sections is ordinarily one section being included in another section, but it is also possible, when there are many sections, to change the integration into the addition among asynchronous interrupt inhibited sections. Namely, R1 and R2 in FIG. 5 are combined to make an asynchronous interrupt inhibited section. In such a case, however, there is no instruction invalid at an exception. This is because, if an exception occurs asynchronously, thread 1 is allowed to delay in throwing an exception to thread 2 (The Java Language Specification 11.3.2).

Figure 8:
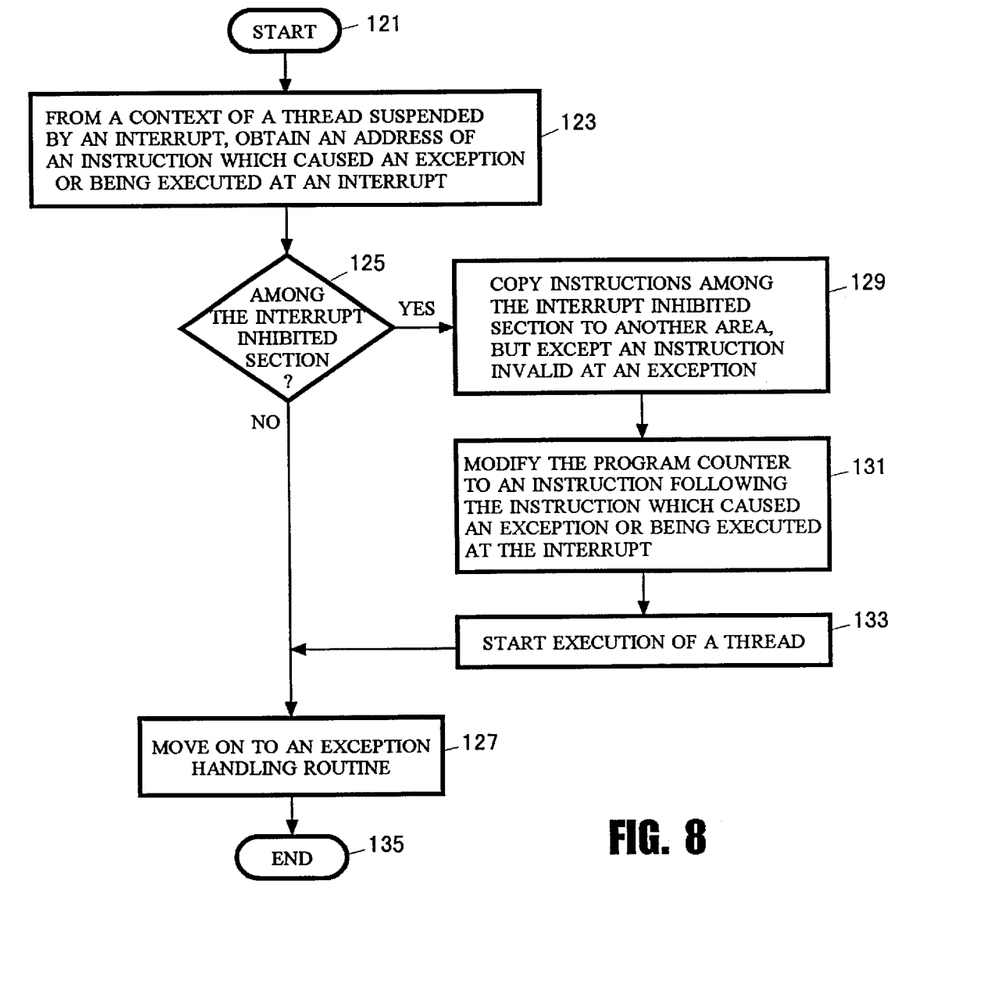
FIG. 8 is a flowchart for explaining a processing of interrupt handler 62.

As above, interrupt inhibited sections are now registered for each method and can be used by interrupt handler 62. Next, processing of interrupt handler 62 is explained. In this embodiment, when an exception has occurred, an interrupt is issued and interrupt handler 62 is activated. Execution of a program is suspended by an interrupt regardless of the program's intent. The process of issuing an interrupt in response to an exception is the same as the conventional one, and the interruption mechanism in operating system 53 is used.

If an interrupt is issued and interrupt handler 62 is activated, the address of the instruction which caused the exception (in case of synchronous exception) or the address of the instruction which was being executed at the interrupt of the suspended thread (in case of asynchronous exception) are obtained from the program counter in the context of the thread suspended by the interrupt (step 123). Then, the exceptional attribute is referred to, and it is determined whether the instruction address is that of an instruction among an interrupt inhibited section (step 125). In that case, if the exceptional attribute indicates an asynchronous interrupt, an asynchronous interrupt inhibited section is to be determined, and if it indicates a synchronous interrupt, a synchronous interrupt inhibited section is to be determined. If it is not among any interrupt inhibited section, it moves on to exception handling routine 60 since the exception can be quickly handled (step 127).

On the other hand, if the instruction is among an interrupt inhibited section, instruction codes among the interrupt inhibited section are copied to another area (step 129). While this copying is not a must, it is performed in order to allow distinction of a special processing. In this case, if an instruction invalid at an exception is registered in the interrupt inhibited section, measures must be taken such as not copying a code of the instruction invalid at an exception or replacing it with an NOP so that it is not executed when execution of the thread is restarted in step 133. Then, a branch code to exception handling routine 60 is attached to the end of the copy as a paste code. Accordingly, when execution of the instruction among an interrupt inhibited section is complete, exception handling routine 60 is executed. Next, the program counter is modified to a next instruction on a copy of the instructions which caused an exception (in case of a synchronous exception) or a next instruction on a copy of the instructions being executed at the interrupt of the thread (step 131). Then, execution of the thread is restarted (step 133). Moreover, it automatically moves on to exception handling routine 60 since the paste code was attached (step 127).

As exception handling routine 60 is a routine for ordinarily handling an exception and is not different from a conventional one, it is not explained here. Also, another exception may occur while executing codes copied in another area. In this case, if it is a synchronous exception, it is immediately handled. If it is an asynchronous exception, an exception request is put in a queue so that the handling is delayed.

Doing as above allows an optimization process like the one conventionally performed in FORTRAN and C to be performed while assuring the precise exception.

The above is just an embodiment and a variety of modification is possible. It is also applicable to other languages which especially require precise exceptions. In such cases, it is also possible that a bytecode like that of Java does not exist. In addition, it is also possible that an intermediate code is not handled. In such a case, optimization processing may not be executed in two times as in FIG. 2. It may be executed in three or more times.

Figure 9:
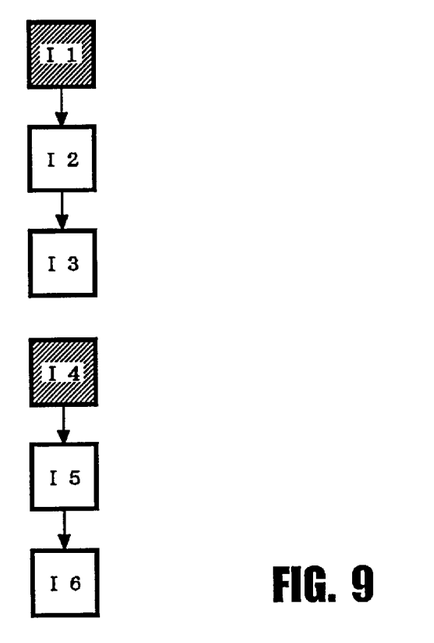
FIG. 9 is a diagram for explaining an example of sequence of instructions.
Figure 10:
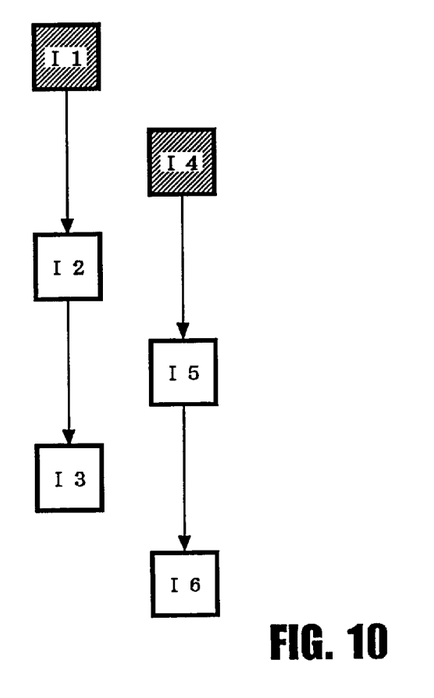
FIG. 10 is a diagram for showing a processing order of an instruction sequence in case of two execution units.

FIG. 9 shows an example. Each square shows an instruction. I1 and I4 are instructions which may cause an exception. And other instructions have a side effect. The arrows show data dependencies. Conventionally, the optimization of instructions as in FIG. 9 was impossible since the precise exception cannot be assured if I4 is moved forward. However, even if an ordinary processor has multiple execution units, executing FIG. 9 as it is will make only one execution unit available. So, I1 and I4, I2 and I5, I3 and I6 are paired so that two execution units are used. Thus, execution speed simply doubles. However, if FIG. 9 becomes FIG. 10 as a result of the pairing, I4 to I3 (I4, I2, I5 and I3: a synchronous interrupt inhibited section) and I5 to I3 (I5 and I3: an asynchronous interrupt inhibited section) become interrupt inhibited sections. If I4 causes an exception, the instructions among the interrupt inhibited sections are copied, and I2 and I3 are executed. I5 is not executed since it is an instruction invalid at an exception.

Accordingly, advantages of the present invention include:
(1) Exception handling could successfully be performed at high speed in an interrupt processing method while assuring a precise exception;
(2) Re-ordering of instructions to be executed could successfully be enabled while assuring the precise exception; and
(3) A compiler which allows high speed execution could successfully be provided while assuring the precise exception.

While the invention has been particularly shown and described with respect to preferred embodiments thereof, it will be understood by those skilled in the art that the foregoing and other changes in form and details may be made therein without departing form the spirit and scope of the invention.

Having thus described our invention, what we claim as new, and desire to secure by letters patent is:

1. A method for compiling a program which is enabled for precise exception handling during execution of the program, comprising the steps of:
   (a) re-ordering a plurality of instructions included in said program during optimization of the program;
   (b) defining a plurality of interupt inhibited sections in the program, each section being defined as a result of an instruction that has a side effect or may cause an exception being moved ahead of one or more instructions that have side effects observable from outside at execution of the program, each defined it inhibited section comprising said moved instruction through a predetermined instruction before said instruction has been moved, each instruction after the moved instruction through said predetermined instruction having a side effect;
   (c) registering said plurality of interrupt inhibited sections with the program for enabling precise exception handling during execution of the program, wherein said side effects of said instructions in each interrupt inhibited section are preserved by enabling execution of said instructions before the handling of said side effect or said exception of said moved instruction during execution of the program.

2. The method according to claim 1, further comprising a step of, if a part of one interrupt inhibited section overlaps another interrupt inhibited section including an instruction to be executed after an instruction included in said one interrupt inhibited section, registering an instruction within said one interrupt inhibited section, said instruction made invalid if an exception occurs within said one interrupt inhibited section.

3. The method according to claim 1, further comprising a step of, if one interrupt inhibited section includes another interrupt inhibited section, integrating said another interrupt inhibited section into said one interrupt inhibited section.

4. The method according to claim 1, further comprising a step of, if two interrupt inhibited sections related to said first instruction partly overlap, registering the section covered by said two interrupt inhibited sections as one interrupt inhibited section.

5. The method according to claim 1, wherein said registering step comprises the steps of: generating an interrupt inhibited sections map by arranging said interrupt inhibited sections by each routine of said program; and generating a code for registering in said routine the interrupt inhibited sections map and an interrupt handler which uses said interrupt inhibited sections map.

6. The method according to claim 1, wherein said predetermined instruction is an instruction having an affect, said affect being observable from the outside at the execution, said instruction located preceding said first or said second instruction by one position.

7. A method for executing a precise exception during execution of a program, said method comprising the steps of:
   (a) issuing an interrupt during the execution of said program in response to an occurrence of the exception for an instruction of the program;
   (b) determining from a processing state interrupted by said interrupt whether the instruction at the interrupt is within an interrupt inhibited section, the interrupt inhibited section defined as a result of an instruction that has a side effect or may cause an exception being moved ahead of one or more instructions that have side effects observable from outside at execution of the program, the defined interrupt inhibited section comprising said moved instruction through a predetermined instruction before said instruction has been moved, each instruction after the moved instruction through said predetermined instruction having a side effect;
   (c) generating a branch instruction for handling the exception after the execution of the interrupt inhibited section if the instruction at the interrupt is within the interrupt inhibited section; and
   (d) restarting the execution of instructions within the interrupt inhibited section following the instruction at the interrupt, wherein side effects of the instructions in the interrupt inhibited section are preserved by enabling execution of the instructions before the handling of the exception.

8. The method according to claim 7, wherein said generating step comprises the steps of: copying codes among said interrupt inhibited section to another area; and generating a branch code to the code for handling an exception after the copied codes.

9. The method according to claim 8, said generating step further comprising a step of, if there exists an instruction invalid at an exception among said interrupt inhibited section, setting so as not to execute the instruction invalid at an exception.

10. The method according to claim 7, wherein said determining step comprises the steps of: if an exception occurs during execution of said second instruction, determining as to an interrupt inhibited section registered in relation to said second instruction; and if an interrupt is issued by any other processing, determining as to an interrupt inhibited section registered in relation to said first instruction.

11. The method according to claim 7, further comprising a step of, if, during execution of said instruction among said interrupt inhibited section, an exception as to said second instruction occurs, branching into a routine for handling said exception.

12. The method for handling an exception according to claim 7, characterized by said instruction invalid.at an exception being said first or said second instruction.

13. A computer comprising a compiler for compiling a program which is enabled for precise exception handling during execution of the program, said compiler comprising of:
   optimization processing means for re-ordering a plurality of instructions included in said program during optimization of said program; and
   interrupt inhibited section definition means for defining a plurality of interrupt inhibited sections in the program, each interrupt inhibited section being defined as a result of an instruction that has a side effect or may cause an exception being moved ahead of one or more instructions that have side effects observable from outside at execution of the program, each defined interrupt inhibited section comprising said moved instruction through a predetermined instruction before said instruction has been moved, each instruction after the moved instruction through said predetermined instruction having a side effect; and
   registration means for registering the plurality of interrupt inhibited sections with the program for enabling precise exception handling during execution of the program, wherein the side effects of the instructions in each interrupt inhibited section are preserved by enabling execution of the instructions before the handling of the side effect or the exception of the moved instruction during execution of the program.

14. The computer according to claim 13, wherein said registration processing means further registers an instruction, if a part of one interrupt inhibited section overlaps another interrupt inhibited section including an instruction to be executed after an instruction included in said one interrupt inhibited section, said instruction being within said one interrupt inhibited section and made invalid if an exception occurs within said one interrupt inhibited section.

15. The computer according to claim 13, wherein said registration processing means comprises:
   means for generating an interrupt inhibited sections map by arranging said interrupt inhibited sections by each routine of said program; and means for generating a code for registering in said routine the interrupt inhibited sections map and an interrupt handler which uses said interrupt inhibited sections map.

16. A computer for executing a precise exception during execution of a program, said computer comprising:
   means for issuing an interrupt during execution of the program in response to an occurrence of an exception for an instruction of the program; and
   an interrupt handler comprising:
   (i) determining means for determining from a processing state interrupted by said interrupt whether the instruction at the interrupt is within an interrupt inhibited section the interrupt inhibited section defined as a result of an instruction that has a side effect or may cause an exception being moved ahead of one or more instructions that have side effects observable from outside at execution of the program, the defined interrupt inhibited section comprising said moved instruction through a predetermined instruction before said instruction has been moved, each instruction after the moved instruction through said predetermined instruction having a side effect;
   (ii) generating means for generating a branch instruction for handling the exception after execution of the interrupt inhibited section if the instruction at the interrupt is within the interrupt inhibited section; and
   (iii) means for restarting the execution of instructions within the interrupt inhibited section following the instruction at the interrupt, wherein side effects of the instructions in the interrupt inhibited section are preserved by enabling execution of the instructions before the handling of the exception.

17. The computer according to claim 16, wherein said generating means executes the steps of:
   copying codes among said interrupt inhibited section to another area; and
   generating a branch code to the code for handling an exception after the copied codes.

18. The computer according to claim 17, wherein, if there exists an instruction invalid at an exception among said interrupt inhibited section, said generating means executes a step of setting so as not to execute the instruction invalid at an exception.

19. The computer according to claim 16, wherein said determining means executes the steps of: if an exception occurs during execution of said second instruction, determining as to an interrupt inhibited section registered in relation to said second instruction; and if an interrupt is issued by any other processing, determining as to an interrupt inhibited section registered in relation to said first instruction.

20. A storage medium for storing a compiler for causing a computer to compile a program which is enabled for precise exception handling during execution of the program, said compiler comprising:
   (a) re-ordering a plurality of instructions included in said program during optimization of the program; and
   (b) defining a plurality of interrupt inhibited sections in the program, each interrupt inhibited section being defined as a result of an instruction that has a side effect or may cause an exception being moved ahead of one or more instructions that have side effects observable from outside at execution of the program, each defined interrupt inhibited section comprising said moved instruction through a predetermined instruction before said instruction has been moved, each instruction after the moved instruction through said predetermined instruction having a side effect; and
   (c) registering the plurality of interrupt inhibited sections with the program for enabling precise exception handling during execution of the program, wherein the side effects of the instructions in each interrupt inhibited section are preserved by enabling execution of the instructions before the handling of the side effect or the exception of the moved instruction during execution of the program.

21. The storage medium according to claim 20, said compiler further comprising a step of: if a part of one interrupt inhibited section overlaps another interrupt inhibited section including an instruction to be executed after an instruction included in said one interrupt inhibited section, registering an instruction within said one interrupt inhibited section which is made invalid if an exception occurs within said one interrupt inhibited section.

22. A storage medium for storing a program which is enabled to execute a precise exception during execution of the program, said program comprising the steps of:
 (a) issuing an interrupt during execution of the program in response to an occurrence of an exception for an instruction of the program;
 (b) determining from a processing state interrupted by said interrupt whether the instruction at the interrupt is within the interrupt inhibited section, the interrupt inhibited section defined as a result of an instruction that has a side effect or may cause an exception being moved ahead of one or more instructions that have side effects observable from outside at execution of the program, the defined interrupt inhibited section comprising said moved instruction through a predetermined instruction before said instruction has been moved, each instruction after the moved instruction through said predetermined instruction having a side effect;
 (c) generating a branch instruction for handling the exception after execution of the interrupt inhibited section if said instruction at the interrupt is within said interrupt inhibited section; and
 (d) restarting execution of instructions within the interrupt inhibited section following the instruction at the interrupt, wherein side effects of the instructions in the interrupt inhibited section are preserved by enabling execution of the instructions before the handling of the exception.

23. The storage medium according to claim 22, said generating step comprising the steps of:
 copying codes among said interrupt inhibited section to another area; and generating a branch code to the code for handling an exception after the copied codes.

* * * * *

UNITED STATES PATENT AND TRADEMARK OFFICE
CERTIFICATE OF CORRECTION

PATENT NO. : 6,634,023 B1
DATED : October 14, 2003
INVENTOR(S) : Takeshi Ogasaware et al.

It is certified that error appears in the above-identified patent and that said Letters Patent is hereby corrected as shown below:

Title page,
Item [57], ABSTRACT,
Line 5, after "order" insert -- of S1, S2, E1, S3 and S4 are re-ordered as in Fig. 7 --
Line 6, "S2which" should read -- S2 which --

Column 2,
Line 37, "An object…" should begin a new paragraph

Column 3,
Line 49, "step-comprises" should read -- step comprises --

Column 8,
Line 10, "Next,…" should begin a new paragraph

Column 9,
Line 19, "However,…" should begin a new paragraph

Column 11,
Line 15, after "invalid" delete "."

Signed and Sealed this

Twenty-fifth Day of May, 2004

JON W. DUDAS
*Acting Director of the United States Patent and Trademark Office*